Sept. 21, 1965    TAKETSUGU HIRAI ETAL    3,207,600
METHOD OF MANUFACTURING ELECTRODES FOR FUEL CELLS
Filed June 5, 1963                            2 Sheets-Sheet 1
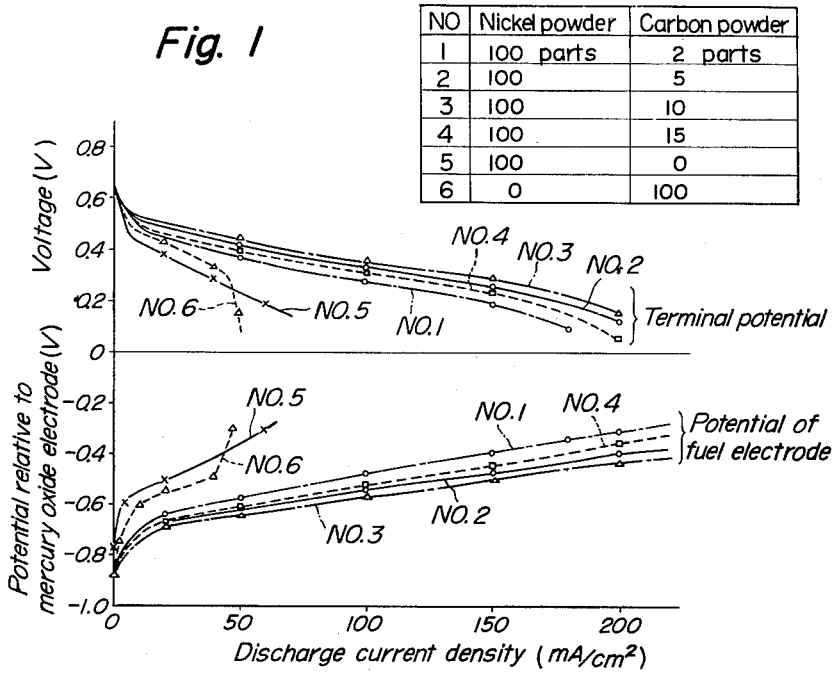
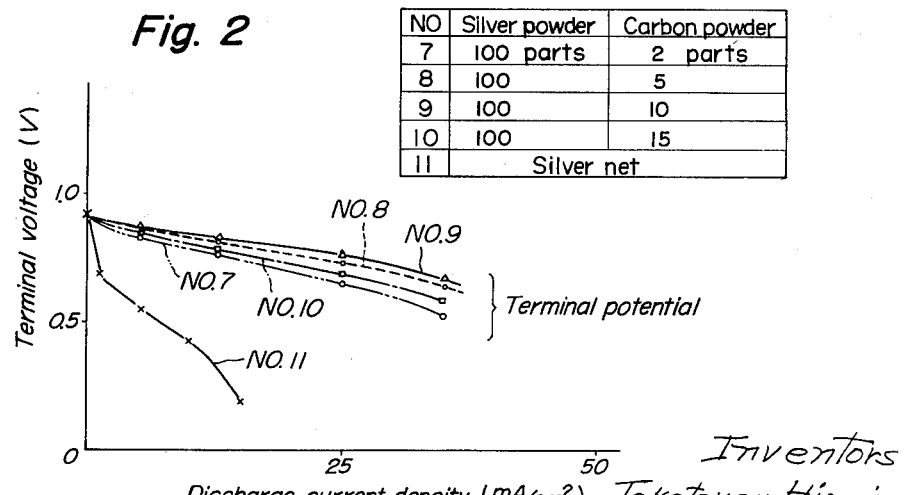
Inventors
Taketsugu Hirai
Tsutomu Iwaki
By Stevens, Davis, Miller & Mosher
Attorneys 3,207,600
METHOD OF MANUFACTURING ELECTRODES FOR FUEL CELLS
Taketsugu Hirai, Hiraoka-shi, and Tsutomu Iwaki, Neyagawa-shi, Japan, assignors to Matsushita Electric Industrial Co., Ltd., Osaka, Japan, a corporation of Japan
Filed June 5, 1963, Ser. No. 285,697
Claims priority, application Japan, June 8, 1962, 37/24,087
3 Claims. (Cl. 75—201)

The present invention relates to a method of manufacturing electrodes adapted for use in fuel cells.

Carbon or metal electrodes have mainly been utilized in the prior art practice as an electrode for a so-called low temperature fuel cell which is adapted to be operated at a temperature below 100° C.

The term "carbon electrode" designates either so-called baked electrodes which may be formed by baking carbon powder consisting of graphite, active carbon and like material together with a tar pitch binder, or so-called non-baked electrodes which may be formed by moulding under pressure a mixture of carbon powder and synthetic resin such as polystyrene, both of these electrodes being called porous carbon electrodes. Metal electrodes of the conventional types may include sintered electrodes formed by sintering metal powder such as of nickel and silver, electrodes formed of Raney metals, and electrodes wherein catalysers are added to nets of nickel, platinum or the like.

In view of the nature of powder of which they are composed, the carbon electrodes have such an advantage as large reaction areas, but have slightly poor performances in respect of electric conductivity as well as strength with the result that great resistance polarization is usually encountered during discharge at high current and it is difficult to obtain the electrodes of desired thickness. Especially, such electrodes have not been satisfactory in respect of strength when thin electrodes are required as in the case of fuel electrodes for liquid fuel cells or electrodes for fuel cells utilizing ion exchange membranes.

The carbon electrodes have not been adaptable particularly to cells of a large capacity, namely those employing electrodes of a large surface area due to the limitation of difficulty in obtaining the electrodes of desired dimensions, and have not been satisfactory in that an attempt to enlarge the surface area of the electrodes would result in the correspondingly large thickness which involves greater electric resistance.

In the case of the metal electrodes of sintered type, such electrodes have greater strength and electric conductivity than the carbon electrodes and it is comparatively easy to obtain those of desired thickness and dimensions. Since, however, these electrodes have an extremely small reaction area, a difficulty has usually been encountered in obtaining the electrodes suitable to large current discharge even with the addition of a catalyser under an optimum condition.

While the electrodes using Raney metals have a greater reaction area than the aforementioned sintered electrodes and demonstrate a relatively improved performance. However, complication in the manufacturing process as well as necessity of various processes such as heating, electrolysis, alkali treatment and the like has usually resulted in a drawback that it has been difficult to obtain a large quantity of uniform electrodes.

Further, the electrodes comprising the metal nets added with catalysers have only found a limited and special application in the fuel cells using ion exchange membranes which can accommodate only a small amount of electrolyte. Since these electrodes have a small surface area and relatively large contact resistance, they are unsuitable for large current discharge.

With the foregoing drawbacks of prior art electrodes in mind, it is the primary object of the present invention to provide an improved method of manufacturing electrodes adapted for fuel cells which have high strength and a large surface area and thereby demonstrate improved performance.

According to the present invention, there is provided a method of manufacturing electrodes for fuel cells characterized in that carbon powder is added to and mixed with powder of a metal electrochemically inactive in anodic and/or cathodic function to form a mixture thereof, and said mixture is then sintered to form such electrodes.

There are other objects and particularities of the present invention, which will become obvious as the description further proceeds.

Or more precisely, the present invention provides a unique method of manufacturing electrodes for fuel cells wherein carbon powder such as active carbon and acetylene black is added to and mixed with powder of a metal electrochemically inactive in anodic and/or cathodic function such as nickel powder, nickel plated copper powder, nickel plated iron powder and silver powder, and subsequently the mixture thereof is sintered in a reducing or inert atmosphere to thereby form an electrode which has high strength and a large surface area with attendant improvement in the performance. In sintered electrodes comprising the powder of such metal which is electrochemically inactive in anodic and/or cathodic function, carbon powder must be enclosed in the network of the sintered bodies.

Manufacture of electrodes from carbon powder alone includes baking or non-baking with the use of a so-called binder, for example a resin such as polystyrene, polyvinyl chloride, furfuryl alcohol and carboxymethylcellulose, or molasses or tar pitch. In the baked bodies, the carbon powder is combined with the binder, while in the non-baked bodies, the carbon powder is combined with carbonized portions of the binder.

Therefore, it is the primary concept of the manufacturing method of the invention to add the binder simultaneously with the addition of carbon powder to metal powder for the purpose of combining the carbon powder with the sintered metal powder. In the electrode thereby obtained, a condition will be observed wherein the sintered metal powder is combined with the carbon powder by means of the carbonized binder.

In this case however, the mixture may preferably be compressed prior to sintering since the binder tends to boil or expand due to such a high temperature during sintering. When the mixture is compressed as described in the above, addition of too much an amount of the carbon powder will obstruct the sintering of the metal powder with each other, and a preferred amount of addition is below 30%.

No compressing process is required when the carbon powder is merely added to and mixed with the metal powder for sintering without the use of the binder. However, in order to insure the presence of the carbon powder within the sintered metal bodies, the amount of the carbon powder to be added has a certain limitation and must be less than 20% which is less as compared with the foregoing instance. Electrodes having good characteristics can be obtained by any of the foregoing two processes.

Nickel powder is most preferred among metal powders, and any of electrolytic nickel, reduced nickel, carbonyl nickel and the like can be used, but carbonyl nickel is the most effective. Metals such as iron and copper which are electrochemically active in anodic and/or cathodic function can even be used when nickel plating is applied on the surface thereof, and further silver powder may be used as well. However, carbonyl nickel is the best of all those in respect of the shape of powder, the cost involved and other factors. The diameter of each particle of such powder may preferably be below 20μ. Carbon powder with too great particle size is liable to obstruct the sintering of the metal powder and the preferred diameter of each particle is below 200μ.

The amount of the binder may vary depending on the material used, but it may be such that carbonized portions thereof are less than 100% with respect to the carbon powder added when the binder has been carbonized by being heated.

Next, consideration will be given to sintering temperatures and sintering duration suitable for the operation. These factors vary not only by the metal powder used but by the amount of carbon powder added. The following table shows the optimum sintering temperatures and duration consistent with desired electrode strength and characteristics:

| Metal powder | Carbon powder added, percent | Allowable sintering condition | Optimum sintering condition |
|---|---|---|---|
| Carbonyl nickel* | 0 | Over 800° C. / Over 10 min. | 850~950° C. / 10~30 min. |
|  | 1~5 | Over 850° C. / Over 10 min. | 880~950° C. / 10~30 min. |
|  | 5~7.5 | Over 900° C. / Over 10 min. | 920~980° C. / 10~30 min. |
|  | 7.5~10 | Over 920° C. / Over 10 min. | 940~990° C. / 10~30 min. |
|  | 10~20 | Over 950° C. / Over 10 min. | 970~1050° C. / 10~30 min. |
| Silver | 0 | Over 450° C. / Over 5 min. | 500~550° C. / 10~15 min. |
|  | 1~5 | Over 470° C. / Over 5 min. | 520~580° C. / 10~15 min. |
|  | 5~7.5 | Over 500° C. / Over 5 min. | 530~600° C. / 10~15 min. |
|  | 7.5~10 | Over 520° C. / Over 5 min. | 550~620° C. / 10~15 min. |
|  | 10~20 | Over 550° C. / Over 5 min. | 580~750° C. / 10~15 min. |

*Powder of electrolytic nickel, reduced nickel or nickel-plated copper may be treated under almost the same condition, but powder of nickel-plated iron must be sintered at temperatures 50° C. higher than those indicated for respective cases but with same duration.

With the electrodes sintered under the above conditions, apparent strength thereof is almost the same and performance is superior to those without any carbon powder.

With regard to the mean diameter of particles used in the above sintering, those of carbonyl nickel, silver and carbon are in a range of from 5 to 6μ, from 20 to 40μ and from 30 to 50μ, respectively. Therefore, it can be concluded that the most advantageous condition consistent with the desired performance will be realized when 2 to 15% of carbon powder of mean particle diameter of from 30 to 50μ is added to carbonyl nickel powder of from 5 to 6μ in mean particle diameter, if carbonyl nickel is used as a metal component. The mixture so formed, which develops a satisfactory performance, may then be sintered at a temperature of from 880 to 1100° C. for 10 to 30 minutes to provide electrodes of good characteristics. In the case of silver, good performance can be obtained when 2 to 15% of carbon powder having mean particle diameter of from 30 to 50μ is added to silver powder having mean particle diameter of from 20 to 40μ, and the mixture thereof may then be sintered at a temperature of from 520 to 650° C. for 10 to 15 minutes to provide electrodes of good characteristics.

Now consideration will be given to the reason why the characteristic of the electrodes can be remarkably improved by the addition of carbon powder. Good electric conductivity can be maintained since particles of carbon powder are sintered neither with metal powder nor between themselves and the metal powder is sintered in a condition wherein the particles of carbon powder are enclosed within structure of sintered base plates, apparently similar to the case of sintering the metal powder alone. Since carbon powder has a very large surface area, its inclusion within electrodes is very desirable and gives a far greater reaction area than without any addition of such carbon powder. The carbon powder also functions as carriers of catalysers when such catalysers are added. Moreover, the addition of carbon powder avoids the contraction of base plates which is inevitable with the base plates made by sintering metal powder alone as high temperatures are used in order to raise the strength of such base plates. The carbon powder when added is included in the form of cores and therefore is effective to restrain the contraction during the sintering and provide a great degree of porosity, with further advantages of affording great strength and preventing the reduction in reaction area.

The contraction during the sintering is largely influenced by the form of metal powder used. Above all, carbonyl nickel is a typical example of such phenomenon and this tendency is materially increased when an attempt is made to obtain thicker electrode plates. In electrode plates of, for example, 4 to 5 mm. in thickness, the contraction and bending take place at the same time and this contraction is mainly attributable to the cause of smaller reaction areas of such electrode plates.

There may be a doubt that the carbon powder which has not been sintered might fall off during use as a component of electrodes for an extended time, but long tests performed with actually assembled fuel cells have proved freedom from such trouble.

Now, preferred embodiments of the present invention will be described in the following along with the test results thereof illustrated in the accompanying drawings, in which:

FIG. 1 is a graphic illustration of performance test results with fuel cells employing electrodes comprising various proportions of nickel powder to carbon powder under different discharge current densities;

FIG. 2 is a graphic illustration similar to FIG. 1, but with with electrodes including silver powder and carbon powder.

Figure 3:
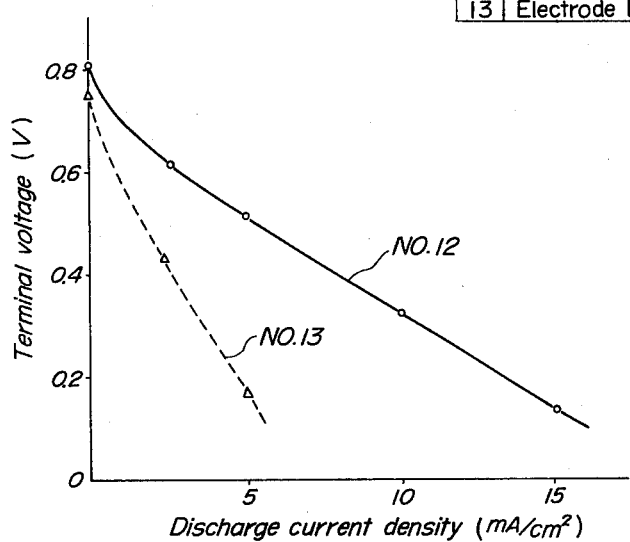
FIG. 3 is also a graphic illustration of comparative test results between an electrode comprising carbonyl nickel powder and carbon powder and an electrode without carbon powder.

(I) In this embodiment, 2, 5, 10, 15, 20 and 30 parts by weight of active carbon with purity 97 to 98% and with particle diameter 30 to 50μ were added to and mixed with respective 100 parts by weight of carbonyl nickel with purity 99.9%, apparent specific gravity 1.0 to 1.2 and with particle diameter 5 to 6μ. The mixtures were then thoroughly agitated and dried. The above powder mixtures were subsequently sintered for 20 minutes at 980° C. in a hydrogen stream to be formed into electrode plates of 0.9 mm. in thickness.

Upon inspection on the electrode plates after having been sintered, it was found that the electrode plate having 30% carbon powder added had poor strength due to too much amount of the carbon powder, the one with 20% carbon powder was slightly weak although satisfactorily usable and those between 2 to 15% showed extremely excellent properties. Porosity of the electrode plates were 68% for nickel powder alone, 76% for 2% carbon powder added, 82% for 5% addition, 86% for 10% addition, 88% for 15% addition and 91% for 20% addition.

A nickel strip was spot welded to each of the electrode plates to provide a terminal strip therefor, and the electrode plates were soaked in a chloroplatinic acid solution for impregnation of said solution into the pores. Then the electrode plates were subjected to reduction for 6 hours at a temperature of 300° C. in a hydrogen stream to obtain about 6 mg. per cubic cm. of platinum held therein in the form of a catalyser and these electrode plates were used as fuel electrodes. Liquid fuel comprised a mixture of methyl alcohol with a 35% caustic potash electrolyte at a volumetric ratio of 30 to 70.

Baked carbon electrodes were used as oxygen electrodes and oxygen was used as an oxidizing agent.

Respective liquid fuel cells were constituted with the above three generating elements and subjected to a discharge test at various current densities at a temperature of 40° C., the results of which were as shown in FIG. 1. For comparison's sake, there are also shown in FIG. 1 test results with a fuel cell which comprises a fuel electrode of 0.9 mm. in thickness wherein platinum is added to a sintered body of nickel powder alone and with a fuel cell which comprises a fuel electrode of 2.5 mm. in thickness wherein platinum is added to a baked carbon electrode (such electrode with thickness below 2.5 mm. unutilizable due to poor strength).

The potentials illustrated for respective electrodes are those relative to a reference electrode which is a mercury oxide electrode. Thus it will be seen that the electrodes according to this invention including an addition of 2 to 15% carbon powder are excellent as a fuel electrode for a liquid fuel cell.

(II) In this embodiment, 2, 5, 10, 15, 20 and 30 parts by weight of active carbon with purity 97 to 98% and with particle diameter 30 to 50μ were added to and mixed with respective 100 parts by weight of silver powder with purity 99.9% and particle diameter of 20 to 40μ. The mixtures were then thoroughly agitated and dried. The above powder mixtures were subsequently sintered for 15 minutes at a temperature of 600° C. in a hydrogen stream to be formed into electrode plates of 0.5 mm. in thickness. Upon inspection, it was found that the electrode plate having 30% carbon powder added had poor strength, the one with 20% carbon powder was slightly weak although satisfactorily usable, and those between 2 to 15% showed extremely good properties.

A silver strip was spot welded to each of the electrode plates to provide a terminal strip therefor, and about 4 mg. per cubic cm. of platinum was added for retention therein in the form of a catalyser so as to form fuel electrode. Diaphragms comprised membranes of polyvinyl alcohol of 0.15 mm. in thickness impregnated with a 30% caustic potash electrolyte. Hydrogen was used as fuel, baked carbon electrodes were used as oxygen electrodes and oxygen was used as an oxidizing agent.

All these elements were assembled to constitute gas fuel cells which had extremely thin overall thickness of 3.5 mm. for each cell. The test results with these fuel cells at a temperature of 35° C. under various current densities are illustrated in FIG. 2, wherein, for comparison's sake, there is shown a test result with a fuel electrode comprising a silver net of 30 meshes which carries a deposit of about 8 mg. per square cm. of platinum. It will thus be seen that the electrodes according to this invention including an addition of 2 to 15% carbon powder are optimum for fuel electrodes for gas fuel cells.

(III) According to this embodiment, 20 parts by weight of charcoal powder with mean particle diameter of 20 to 40μ and 10 parts by weight of a 10% carboxymethyl-cellulose solution are added to and mixed with 100 parts by weight of carbonyl nickel with purity 99.9%, apparent specific gravity of 1.0 to 1.2 and with particle diameter of 5 to 6μ. The mixture was then dried and sintered for 30 minutes at a temperature of 950° C. in a hydrogen atmosphere to obtain an electrode of 0.7 mm. in thickness, to which 6 mg. per cubic cm. of platinum was subsequently added as a catalyser and which was designated as the electrode A. While the electrode B had such a composition that carbonyl nickel powder alone was sintered and platinum was added to the sintered body as a catalyser.

These two electrodes A and B were employed as fuel electrodes and two fuel cells were composed, respectively, by incorporating oxygen electrodes of baked carbon type, an oxidizing agent in the form of oxygen and fuel and an electrolyte of a solution including 30 parts of methanol and 70 parts of a 30% caustic potash solution. Discharge test results with the fuel cells are as shown in FIG. 3 and the following table, from which it will be readily seen that the electrode A is far better than the electrode B.

| Current density (ma./cm.²) | Discharge voltage (V) | | |
|---|---|---|---|
| | 2.5 | 5 | 10 |
| A | 0.61 | 0.52 | 0.34 |
| B | 0.42 | 0.16 | |

The above fuel cell developed the voltage of 0.42 v. and the current of 1.5 A. when discharged under supply of oxygen.

The electrode was compressed, before sintering, under pressure of 1 ton per square cm., but a pressure of from 10 kgs. per square cm. to 3 tons per square cm. will suffice in general applications.

From the foregoing it is apparent that, according to the method of the present invention, carbon powder is added to and mixed with powder of a metal electrochemically inactive in anodic and/or cathodic function and the mixture is then sintered to form an electrode having great strength and a large surface area, which electrode when incorporated in a fuel cell greatly improves the performance of such fuel cell with resultant great advantages in industrial applications.

What is claimed is:

1. A method for manufacturing electrodes for use in fuel cells, comprising the steps of mixing 2 to 15 parts of active carbon powder having a mean particle diameter of 30 to 50μ with 100 parts of carbonyl nickel powder having a mean particle diameter of 5 to 6μ, molding the resultant mixture into the form of electrodes, and sintering the molded mixture in a hydrogen atmosphere for 20 minutes at 980° C.

2. A method for manufacturing electrodes for use in fuel cells, comprising the steps of mixing 20 parts of charcoal powder having a mean particle diameter of 20 to 40μ and 10 parts of a 10% aqueous solution of carboxymethyl-cellulose with 100 parts of carbonyl nickel powder having a mean particle diameter of 5 to 6μ, molding the resultant mixture under a pressure of 1 ton per square cm. into the form of electrodes, and sintering the molded mixture in a hydrogen atmosphere for 30 minutes at 950° C.

3. Method for manufacturing electrodes for use in liquid fuel cells, comprising the steps of mixing 1 to 20 parts of carbon powder having a particle diameter of less than 200μ with 100 parts of carbonyl nickel powder having a mean particle diameter of 5 to 6μ, molding the resulting mixture into the form of electrodes and sintering the molded mixture in a reducing atmosphere for 10 to 30 minutes at 850–1100° C.

References Cited by the Examiner

UNITED STATES PATENTS

| | | | |
|---|---|---|---|
| 747,454 | 12/03 | Lowendahl | 252—503 |
| 1,067,003 | 7/13 | Deats | 75—200 |
| 1,774,381 | 8/30 | Kiefer | 252—503 |
| 1,988,861 | 1/35 | Thorausch | 75—200 |
| 2,646,456 | 7/53 | Jacquier | 75—212 |
| 2,933,415 | 4/60 | Homer et al. | 75—212 |
| 2,985,599 | 5/61 | Bradley | 252—503 |

FOREIGN PATENTS 5,400   11/82   Great Britain.

OTHER REFERENCES

Goetzel: Treatise on Powder Metallurgy, vol. II, 1950, Interscience Publishers, Inc., pp. 214–217.

REUBEN EPSTEIN, *Primary Examiner.*

CARL D. QUARFORTH, BENJAMIN R. PADGETT,
*Examiners.*